United States Patent [19]

Fodor

[11] 4,051,197

[45] Sept. 27, 1977

[54] BLEND OF RADIAL BLOCK COPOLYMERS HAVING HIGH IMPACT STRENGTH

[75] Inventor: Lawrence M. Fodor, Bartlesville, Okla.

[73] Assignee: Phillips Petroleum Company, Bartlesville, Okla.

[21] Appl. No.: 630,607

[22] Filed: Nov. 10, 1975

[51] Int. Cl.² ............................................. C08L 53/02
[52] U.S. Cl. ............................. 260/876 B; 260/880 B
[58] Field of Search ........................ 260/880 B, 876 B

[56] References Cited

U.S. PATENT DOCUMENTS

| | | | |
|---|---|---|---|
| 3,281,383 | 10/1966 | Zelinski | 260/880 B |
| 3,507,934 | 4/1970 | Minor | 260/876 |
| 3,637,554 | 1/1972 | Childers | 260/880 B |
| 3,639,517 | 2/1972 | Kitchen | 260/879 |
| 3,954,696 | 5/1976 | Roest | 260/880 B |

Primary Examiner—Paul R. Michl

[57] ABSTRACT

Two or more separate radial block copolymers of a monovinyl-substituted aromatic compound and a conjugated diene each having a heterogeneity index (ratio of weight average to number average molecular weight) for the monovinyl-substituted aromatic block outside the range of about 2.8 to 3.5 are mixed to give a blend having a heterogeneity index for the monovinyl-substituted aromatic compound blocks within the range of about 2.8 to 3.5, said blend having a high impact strength.

9 Claims, No Drawings

BLEND OF RADIAL BLOCK COPOLYMERS HAVING HIGH IMPACT STRENGTH

BACKGROUND OF THE INVENTION

This invention relates to high impact blends of monovinyl-substituted aromatic compound/conjugated diene block copolymers.

It is broadly known to produce either rubbery or resinous radial block copolymers as disclosed in Zelinski et al U.S. Pat. No. 3,281,383. It is also known that radial block copolymers made with a sufficiently high content of monovinyl-substituted aromatic compound so as to be resinous have a high impact strength if the monovinyl-substituted aromatic compound and initiator are added in two or more increments as opposed to the lower impact strength achieved when the monovinyl-substituted aromatic compound is added in a single increment. This is disclosed in Kitchen et al U.S. Pat. No. 3,639,517.

SUMMARY OF THE INVENTION

It is an object ot this invention to provide high impact block copolymers;

It is a further object of this invention to provide high impact block copolymer without the necessity of multiple addition of initiator and monovinyl-substituted aromatic compound; and It is yet a further object of this invention to provide an improved blend of monovinyl-substituted aromatic compound/conjugated diene copolymers.

In accordance with this invention, there is provided a blend of two resinous radial copolymers of monovinyl-substituted aromatic compound/conjugated diene which blend has a heterogeneity index for the monovinyl-substituted aromatic compound blocks of at least about 2.8, preferably within the range of about 2.8 to 3.5.

DESCRIPTION OF THE PREFERRED EMBODIMENTS

It has been found that the high impact strength of resinous radial block copolymers made with incremental addition of the monovinyl-substituted aromatic compound and initiator is related to the morphology. Specifically, with a very low heterogeneity index for the monovinyl-substituted aromatic compound block, i.e., less than aboout 2.8, the morphology is characterized by spheres of the diene component in the monovinyl-substituted aromatic compound component. At a heterogeneity index above about 3.5 the morphology exhibits an inverted structure having spheres or ellipsoids of the monovinyl-substituted aromatic component in a continuum of the diene component. This structure gives a cheesy (weak and crumbly) product. This change is property above a heterogeneity index of about 3.5 may also be affected by incompatibility due to great differences in the molecular weights of the block. However, within the desired range of heterogeneity index of about 2.8 to 3.5 for the monovinyl-substituted aromatic compound block of the radial polymer blends, there is present an alternating lamellar structure comprising alternate layers of conjugated diene blocks and layers of monovinyl-substituted aromatic compound blocks.

Accordingly, in accordance with the instant invention, there is provided blends of two block copolymers each of which has a heterogeneity index for the monovinyl-substituted aromatic compound blocks outside the range of about 2.8 to 3.5, the blend being within this range. By heterogeneity index as used herein is meant the ratio of the weight average to the number average molecular weight of the polymerized monovinyl-substituted aromatic compound component.

The weight average and number average molecular weights used in calculating the heterogeneity index values are calculated as is known in the art based on the quantities of reagents used in each recipe. Specifically, monodispersity is assumed which is a reasonable approximation since the molecular weight distribution of each polymer produced is extremely narrow. Then the numer of moles of initiator is divided into the number of grams of monomer to give grams polymer per mole or number average molecular weight which is essentially the same as weight average. This is then substituted into the formula set out hereinbelow. Past experience based on actually digesting a copolymer in peroxide to leave out the polymerized styrene block which was then analyzed using gel permeation chromatography has shown the calculated values to agree closely with the measured values.

The term resinous is used in the conventional sense to means a normally solid material not having rubbery properties. Generally, such materials will have a Shore D hardness (ASTM D-1706-61) of greater than 62, generally greater than 65. These final compositions of the invention and the constituent components will have from 50 to 95 weight percent polymerized monovinyl-substituted aromatic component.

Heterogeneity index (HI) is expressed by the formula:

$$HI = \frac{\bar{M}_w}{\bar{M}_n} = \frac{\left(\frac{W_1 S_1 M_{S1} + W_2 S_2 M_{S2}}{W_1 S_1 + W_2 S_2}\right)}{\left(\frac{N_1 M_{S1} + N_2 M_{S2}}{N_1 + N_2}\right)}$$

where:
W is weight of fraction (1 = major, 2 = minor)
S is styrene content of the fraction
N is moles sytrene blocks in fraction
$M_S$ is molecular weight of styrene block in fraction for the case where a mixture of two polymers is prepared. Three or more polymers can also be used and such is within the scope of this invention.

As an example of the calculations, the following is a calculation of the HI for Run 2 of Table II.

$M_{S1} = 60 \times 10^3$ $M_{S2} = 50 \times 10^3$ $W_1 = 0.62$ $W_2 = 0.38$ $S_1 = \frac{120 \times 10^3}{150 \times 10^3} = 0.80$ $S_2 = \frac{100 \times 10^3}{150 \times 10^3} = 0.667$ $N_1 = \frac{62\% \times 0.8}{60 \times 10^3} = 0.827 \times 10^{-3}$ $N_2 = \frac{38\% \times 0.667}{50 \times 10^3} = 0.508 \times 10^{-3}$ -continued $$HI = \frac{\frac{0.62 \times 0.80 \times 60 \times 10^3 + 0.38 \times 0.667 \times 50 \times 10^3}{0.62 \times 0.80 + 0.38 \times 0.667}}{\frac{0.827 \times 60 \times 10^3 + 0.508 \times 50 \times 10^3}{0.827 + 0.508}}$$

$$= \frac{\frac{(29.76 + 12.67) \times 10^3}{.496 + .253} = \frac{42.43 \times 10^3}{0.749} = 56.6 \times 10^3}{\frac{(49.6 + 25.4) \times 10^3}{1.335} = \frac{75 \times 10^3}{1.335} = 56.2 \times 10^3} = 1.0$$

The polymers of this invention are individually prepared according to the method described in Kitchen et al U.S. Pat. No. 3,639,517 except that multiple addition of the monovinyl-substituted aromatic compound is not necessary. The disclosure of said Kitchen et al patent is hereby incorporated by reference. Briefly, in accordance with the procedure outlined therein, sequential polymerization of styrene or other monovinyl-substituted aromatic hydrocarbon and butadiene or other conjugated diene is carried out and thereafter the resulting lithium-terminated polymer is coupled with a polyfunctional treating agent. As noted hereinabove, only a single charge of monovinyl-substituted aromatic compound and initiator is required for each individual polymer used to prepare the blends of this invention. Sytrene and 1,3-butadiene are the presently preferred monomers.

In this invention, the polymer solutions resulting from two separate polymerizations as described above are combined and mixed to form an intimate mixture of the polymer solutions. Subsequently, the mixture is recovered following the procedures described in said Kitchen et al patent. It is also within the scope of this invention to form mixtures of separately recovered polymers by intensive mixing in Banbury mixers, extrusion compounding, roll milling, solution blending, and the like.

The general method of preparing the high impact polymers of this invention is summarized by giving the charge order for forming two polymers, each polymer having different block lengths, followed by mixing as follows:

| Reactor one | Reactor two |
|---|---|
| a) cyclohexane | cyclohexane |
| b) styrene | styrene |
| c) tetrahydrofuran | tetrahydrofuran |
| d) n-butyllithium | n-butyllithium |
| e) polymerize at 50–60° C | polymerize at 50–60° C |
| f) butadiene | butadiene |
| g) polymerize at 50–60° C | polymerize at 50–60° C |
| h) polyfunctional treating agent | polyfunctional treating agent |
| i) combine solutions | |
| j) add stabilizer system | |
| k) devolatilize | |
| l) finish (form granules or pellets) | |

The sequence given above in each reactor is for making diblocks which are coupled by the polyfunctional treating agent to form a polymer which can be expressed as: (styrene-butadiene)$_n$Y where Y is the polyfunctional treating agent and $n$ is an integer of 3–7 or more. It is within the scope of this invention to employ as one of more components of the blend one or more polymers made by multiple addition of monovinyl-substituted aromatic hydrocarbon and initiator wherein for some reasons the resulting polymer is off specification, i.e., has a heterogeneity index outside the range of about 2.8 to 3.5. Broadly then the invention resides in the blending of two radial block copolymers of a monovinyl-substituted aromatic compound and a conjugated diene each having a heterogeneity index outside the range of about 2.8 to 3.5 with at least one less than 2.8 to give a blend having a heterogeneity index within the range of 2.8 to 3.5.

Exemplary polyfunctional treating agents (i.e., treating agents having at least three functional groups per molecule) that can be used in accordance with this invention in the preparation of the branched block copolymers are the polyepoxides such as epoxidized linseed oil, epoxidized soybean oil, and 1,2,5,6,9,10-triepoxydecane; polyimines such as tri(1-aziridinyl)-phosphine oxide; polyisocyanates such as benzene-1,2,4-triisocyanate; polyaldehydes such as 1,4,7-naphthalene-tricarboxyaldehyde; polyhalides such as silicon tetrachloride or polyketones such as 1,4,9,10-anthraceneketrone and polyalkoxysilanes such as methyltrimethoxysilane.

EXAMPLE — PART I

A series of diblock polymers containing polymerized styrene and polymerized butadiene was prepared in 32 ounce (0.95 liter) glass beverage bottles and coupled with epoxidized soybean oil containing an average of 4 epoxide groups per molecule. In each run, the following materials were added to the bottle, while under nitrogen, in the order shown:

1. cyclohexane (C$_y$C$_6$) then first increment of styrene (S)
2. purge 5 minutes with nitrogen, cap and fill with nitrogen
3. tetrahydrofuran (THF)
4. n-butyllithium (0.023 g/cm$^3$ in cyclohexane) BuLi
5. react at 60° C for 30 minutes
6. second increment of sytrene (if used) and react 60° C for 30 minutes — note that no additional initiator is added so this is not a multiple addition of styrene in the sense contemplated by said Kitchen et al patent
7. butadiene (B), react at 60° C for 30 minutes
8. epoxidized soybean oil (ESO) and react at 60° C for 30 minutes
9. stabilizer system 2 parts by weight per 100 parts by weight monomer (phm).

The quantities of each component used are given in the following table.

Table I

| | | \multicolumn{8}{c}{Individual Radial Block Copolymer Formation} | |
| | | \multicolumn{8}{c}{Effective[a]} | |
| Run No. | C$_y$C$_6$ (cm$^3$) | First S | | THF | BuLi | Second S | | B | | ESO |
| | | (g) | (cm$^3$) | (g) | (cm$^3$) | (g) | (cm$^3$) | (g) | (cm$^3$) | (g) |
|---|---|---|---|---|---|---|---|---|---|---|
| 1 | 400 | 26.5 | 29.1 | 0.073 | 2.0 | 0 | | 27.5 | 45.4 | 0.27 |
| 2 | 400 | 50.0 | 55.0 | 0.023 | 3.2 | 28.7 | | 31.5 | 7.3 | 12.0 0.43 |
| 3 | 400 | 31.9 | 35.0 | 0.013 | 2.0 | 0 | | 0 | 23.1 | 38.1 0.27 |
| 4 | 400 | 50.0 | 55.0 | 0.023 | 3.2 | 23.1 | | 25.4 | 11.9 | 19.6 0.43 |
| 5 | 400 | 36.2 | 39.8 | 0.013 | 2.0 | 0 | | 0 | 17.8 | 29.4 0.27 |
| 6 | 400 | 50.0 | 35.0 | 0.023 | 3.2 | 18.8 | | 20.6 | 17.2 | 28.4 0.43 |
| 7 | 220 | 27.7 | 30.5 | 0.013 | 6.7 | 0 | | 0 | 23.0 | 28.0 0.25 |
| 8 | 400 | 50.0 | 55.0 | 0.023 | 1.7 | 28.0 | | 30.8 | 12.2 | 20.0 0.45 |

Table I-continued

Individual Radial Block Copolymer Formation

| Run No. | $C_yC_6$ (cm³) | First S (g) | First S (cm³) | THF (g) | Effective[a] BuLi (cm³) | Second S (g) | Second S (cm³) | B (g) | B (cm³) | ESO (g) |
|---|---|---|---|---|---|---|---|---|---|---|
| 9  | 220 | 32.4 | 35.6 | 0.013 | 6.7 | 0    | 0    | 18.4 | 30.4 | 0.25 |
| 10 | 600 | 50.0 | 55.0 | 0.023 | 1.7 | 23.0 | 25.3 | 16.9 | 27.7 | 0.45 |
| 11 | 220 | 38.4 | 42.1 | 0.013 | 6.7 | 0    | 0    | 12.7 | 21.0 | 0.25 |
| 12 | 600 | 50.0 | 55.0 | 0.023 | 1.7 | 17.5 | 19.2 | 22.5 | 37.1 | 0.45 |
| 13 | 220 | 24.0 | 26.4 | 0.013 | 6.7 | 0    | 0    | 26.0 | 43.0 | 0.25 |
| 14 | 400 | 50.0 | 55.0 | 0.023 | 1.7 | 32.3 | 35.5 | 7.7  | 12.7 | 0.45 |
| 15 | 400 | 40.5 | 44.5 | 0.013 | 2.0 | 0    | 0    | 15.5 | 22.3 | 0.27 |
| 16 | 400 | 50.0 | 55.0 | 0.023 | 3.2 | 14.5 | 15.9 | 21.5 | 35.5 | 0.43 |
| 17 | 175 | 11.6 | 12.8 | 0.006 | 3.2 | 0    | 0    | 12.5 | 20.6 | 0.27 |
| 18 | 310 | 39.0 | 42.9 | 0.011 | 0.8 | 0    | 0    | 3.9  | 6.4  | 0.07 |
| 19 | 175 | 15.4 | 16.9 | 0.006 | 3.2 | 0    | 0    | 8.7  | 14.3 | 0.27 |
| 20 | 310 | 35.2 | 38.7 | 0.011 | 0.8 | 0    | 0    | 7.7  | 12.7 | 0.07 |

[a]Slightly more than this was used depending on the measured catalyst poisons. The effective amount is the cc of the solution used in addition to a small amount needed to scavenge poisons.

Notes:
The styrene in each even numbered run was added in two portions because of safety considerations. After the first portion polymerized, the remainder was charged and allowed to polymerize. Thus, a single polystyrene block was formed from two styrene portions, i.e., it was not multiple additions as defined hereinbefore because no additional initiator was added.

The THF and ESO were each added as a solution in cyclohexane, having 0.034 gram compound per cm³ solvent.

The stabilizer system consisted of 1.5 phm tri(mixed mono- and dinonylphenyl) phosphite (Wytox 312), and 0.5 phm 2,6-di-t-butyl-4-methylphenol contained in cyclohexane.

Model DVV-II (Toyo Instruments Co., Tokyo, Japan). All experiments were made on test samples cut from the compression molded film which were about ⅛ inch wide (0.05 cm), 1.2 inch long (3 cm) and about 10 mils (0.025 cm) in thickness. The samples were tested at 35 $H_z$ at temperatures ranging from about −100° C to about 20° C.

Table II

| Table I Cements Combined Runs | New Run No. | Melt[a] Flow (g/10 min) | Block Molecular Wt. Fraction Block Molecular[b] Weight × 10⁻³ S | Block Molecular Wt. Fraction B | Block Molecular Wt. Fraction S | Block Molecular Wt. Fraction Wt. % | Low Molecular Wt. Fraction Block Molecular Weight × 10⁻³ S | Low Molecular Wt. Fraction B | Low Molecular Wt. Fraction S | Low Molecular Wt. Fraction Wt. % | Calculated Styrene Block HI | Vibron Results Tan δ Max | Vibron Results T(Tan δ Max) °C | Remarks |
|---|---|---|---|---|---|---|---|---|---|---|---|---|---|---|
| 15,16 | 1  | 3.3 | 56  | 38 | 56  | 100[f] | na[c] |    |    | na | 1.0 | 0.0265 | −98 | control |
| 5,6   | 2  | 4.7 | 60  | 30 | 60  | 62  | 50 | 50 | 50 | 38 | 1.0 | 0.0225 | −95 | control |
| 3,4   | 3  | 2.0 | 65  | 20 | 65  | 62  | 44 | 62 | 44 | 38 | 1.0 | 0.0225 | −93 | control |
| 1,2   | 4  | 2.9 | 69  | 12 | 69  | 62  | 37 | 76 | 37 | 38 | 1.1 | 0.0250 | −98 | control |
| 11,12 | 5  | 2.3 | 110 | 76 | 110 | 62  | 16 | 10 | 16 | 38 | 2.2 | 0.0285 | −95 | control |
| 9,10  | 6  | 1.4 | 120 | 56 | 120 | 62  | 13 | 16 | 13 | 38 | 2.5 | 0.0310 | −91 | control |
| 19,20 | 7  | 2.7 | 123 | 54 | 123 | 64  | 13 | 16 | 13 | 36 | 2.7 | 0.0245 | −91 | control |
| 7,8   | 8  | 1.3 | 128 | 40 | 128 | 62  | 12 | 18 | 12 | 38 | 2.8 | 0.0625 | −87 | invention |
| 13,14 | 9  | 1.8 | 135 | 26 | 135 | 62  | 10 | 22 | 10 | 38 | 3.1 | 0.0700 | −83 | invention |
| 17,18 | 10 | 4.5 | 136 | 28 | 136 | 64  | 10 | 22 | 10 | 36 | 3.1 | 0.1050 | −81 | invention |
| na    | 11 | 6   | 56  | 19 | na  | 100 | na |    |    | na | 1.0 | 0.027  | −93 | control[d] |
| na    | 12 | 6   | 139 | 11 | na  | 62  | 11 | 11 | na | 38 | 3.0 | 0.149  | −78 | control[e] |

[a]Determined in accordance with ASTM test procedure D1238-62T at 200° C and 5 kg load.
[b]Number average molecular weights of blocks calculated as described hereinabove which, because of the essentially monodisperse nature, is the same as weight average.
[c]Not applicable.
[d]Dart impact value of < 10 in-lbs.
[e]Dart impact value of 53.0 in-lbs.
[f]Both polymers were essentially identical.

EXAMPLE — PART II

The polymer cements made in Part I of the Example were combined in pairs, i.e., runs 1 and 2, 3 and 4, 5 and 6, etc., to obtain a cement, in each instance, except for two control runs containing a mixture of polymers of differing polystyrene block molecular weights. Each cement mixture was thoroughly blended together, devolatilized in a vacuum oven at 210° F (99° C), and the dried material was milled on a roll mill at 280° F (138° C) for 3 minutes after banding commenced to further homogenize and densify the sample. Film samples for the dynamic viscoelastic measurements were prepared by compression molding 1 g samples at 5000 psig (34.47 MPa g) for 4 minutes and then for 1 minute at 30,000 psig (206.8 MPa g). The samples were cooled in about 10–15 minutes to about 190° F (88° C) under the 30,000 psig initial pressure by passing cooling water through the press and then removed. The measurements of dynamic modulus and loss angle were carried out by means of a Vibron Direct Reading Viscoelastometer, In discussing the test results, especially the Vibron results, it is to be noted that the magnitude of the maximum logs tangent (tan δ max) and the temperature at which the tan δ max occurs for the polybutadiene blocks are used as criteria of polymer morphology. From work on other polymers it is observed that test samples exhibiting high tan δ max values, i.e., from about 0.045 to about 0.200 or more along with T(tan δ max) ranging from about −87° to about −75° C have dart impact values ranging from about 20 to greater than the test limit of 80 in.-lbs. Micrographs taken on multiple addition polymers of the type described in said Kitchen et al patent as exemplified in control run 12, having a tan δ max of 0.149, T(tan δ max) of −78° C, dart impact of 53.0 in.-lbs. and a HI of 3.0 are shown to possess lamellar morphology. Since the invention polymers of runs 8, 9 and 10 possess the requisite HI values (2.8 to 3.1), the requisite tan δ max values (0.0625 to 0.1050) and requisite T(tan δ max) values of (−87° to −81°) it is reasoned that these polymers would exhibit lamellar morphology and that therefore their dart impact values, if run, would fall between 20 and 80 in.-lbs.

Control run 11 illustrates properties of a typical single styrene and initiator addition polymer which exhibits relatively low impact strength compared to the multiple addition polymers of said Kitchen et al patent and the blends of this invention. Micrographs taken of single addition polymers show them to possess a spherical morphology in which spheres of polybutadiene are embedded in a continuum of polystyrene. On impact, the polystyrene phase takes most of the load, hence these polymers exhibit relatively low impact values. Control runs 1 to 7 are illustrative of polymers also possessing the spherical morphology of the polymer of control run 11, by analogy, since the HI values of each polymer are less than 2.8. The Vibron test results, i.e., tan δ max of less than about 0.045 along with T (tan δ max) values of less than about −88° C for control runs 1 to 7 are typical of polymers exhibiting the spherical morphology.

While this invention has been described in detail for the purpose of illustration, it is not to be construed as limited thereby but is intended to cover all changes and modifications within the spirit and scope thereof.

I claim:

1. A composition comprising a blend of at least two separately prepared resinous radial block copolymers of a monovinyl-substituted aromatic compound and a conjugated diene, each of said copolymers having a heterogeneity index of polymerized monovinyl-substituted aromatic compound blocks outside the range of 2.8 to 3.5, said blend having a heterogeneity index of polymerized monovinyl-substituted aromatic compound blocks within the range of about 2.8 to 3.5.

2. A composition according to claim 1 wherein said copolymers are each copolymers of styrene and 1,3-butadiene.

3. A composition according to claim 2 wherein said copolymers are made by multiple addition of styrene and initiator.

4. A composition according to claim 2 wherein said copolymers are prepared by introducing initiator and said styrene into a polymerization zone in a single portion.

5. A composition according to claim 2 wherein said blend exhibits a morphology characterized by an alternating lamellar configuration.

6. A resinous composition comprising a blend of two resinous copolymers, each copolymer being separately prepared by the sequential addition of a monovinyl-substituted aromatic compound and an initiator, a conjugated diene, and a polyfunctional coupling agent having at least three functional groups per molecule, each of said copolymers having a heterogeneity index of polymerized monovinyl-substituted aromatic compound blocks outside the range of 2.8 to 3.5, said blend having a heterogeneity index of polymerized monovinyl-substituted aromatic compound blocks within the range of about 2.8 to 3.5.

7. A composition according to claim 6 wherein said monovinyl-substituted aromatic compound is styrene and said conjugated diene is 1,3-butadiene.

8. A composition according to claim 6 wherein said coupling agent is selected from the group consisting of polyepoxides, polyimines, polyisocyanates, polyhalides, and polyketones.

9. A composition according to claim 6 wherein said coupling agent is epoxidized soybean oil.

* * * * *